(No Model.)
J. A. ALEXANDER.
ADJUSTABLE TRACE CONNECTION FOR HAMES.
No. 332,859. Patented Dec. 22, 1885.
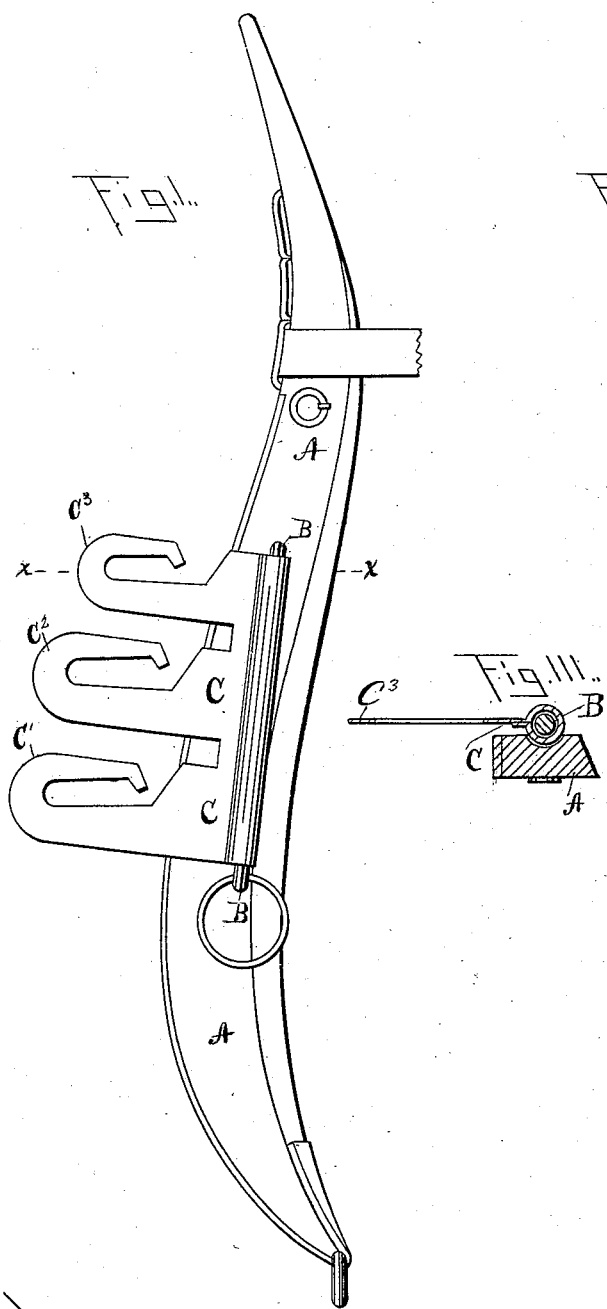

UNITED STATES PATENT OFFICE.

JULIUS A. ALEXANDER, OF MONTICELLO, ARKANSAS.

ADJUSTABLE TRACE-CONNECTION FOR HAMES.

SPECIFICATION forming part of Letters Patent No. 332,859, dated December 22, 1885.

Application filed April 20, 1885. Serial No. 162,737. (No model.)

*To all whom it may concern:*

Be it known that I, JULIUS A. ALEXANDER, a citizen of the United States, residing in Monticello, in the county of Drew and State of Arkansas, have invented a new and useful Improvement in Adjustable Trace-Fastenings; and I hereby declare the following to be a full and clear description thereof.

This invention has for its object the construction of a metallic coupling for attaching the trace of a horse's harness to the hame, so as to adjust the position of the trace vertically on the hame, thereby rendering the draft of the trace easier on the animal by fitting the position of the trace and the line of strain just in the proper position on the animal, and adapting the harness to animals of different sizes or of different build or form.

The invention will be readily understood by reference to the accompanying drawings, of which—

Figure I is a front elevation of a hame provided with one of the improved coupling-tugs or trace-fastenings. Fig. II is a side elevation of the hame and the holding-rod secured to its front face and parallel with it, but with the socketed tug-piece or trace-fastening removed from the said holding-rod. Fig. III is a transverse section of the hame, holding-rod, and the attached tug-piece or trace-coupling, taken on the line $x\,x$ of Fig. I.

The hame A is made in the usual form, and has secured to its front face and parallel with it a holding rod or bar, B. The ends of the said holding-rod are bent rearwardly, passed through and riveted fast into the hame. This holding-rod is, say, three inches long, (more or less,) and is held at a short distance from the front face of the hame; or a recess is formed in the front face of the hame, as shown in Fig. II, so as to allow free room for the tug-piece or coupling-plate C to turn. The coupling-plate C is bent or clinched around the holding-bar B, and thereby coupled securely with it, and thereby with the hame, though it is free to partly rotate on its said holding-rod B, so that its free end may be readily attached to the trace. The free end of the tug or coupling-plate C carries several hooks, $C'\,C^2\,C^3$, &c., arranged at different heights, so that the trace may be attached to either of these hooks, and thereby adjusted as to elevation, so that it may be arranged to suit any particular line of traction, and consequently adapted to fit any particular collar or the physical formation of any animal.

Having thus described my invention, what I claim as new, and desire to secure by Letters Patent, is—

In an improved hame and trace coupling, the staple-formed bar B, adapted to be riveted to the hame, in combination with the plate C, hinged to such bar, and provided with a series of connecting-hooks arranged at different heights, all substantially as shown and set forth.

In witness whereof I have hereunto set my hand this 4th day of April, 1885.

JULIUS A. ALEXANDER.

In presence of—
JOHN GRIGGS MCKENNEY,
GEORGE D. STEDMAN.